ously to those reactant.

United States Patent Office
3,080,248
Patented Mar. 5, 1963

3,080,248
CORROSION INHIBITIVE PIGMENT AND METHOD OF MAKING SAME
William P. Wilke III, Hammond, Ind., John S. Nordyke, Pittsburgh, Pa., and James O. Johnstone, Elmhurst, Ill., assignors to Hammond Lead Products, Inc., Hammond, Ind., a corporation of Indiana
No Drawing. Filed June 30, 1960, Ser. No. 39,800
18 Claims. (Cl. 106—297)

In the copending application No. 38,137, filed June 23, 1960, were described new corrosion inhibitive pigments and a method of manufacture.

It has been found through extensive testing that the pigment or pigments described, while possessing excellent corrosion inhibitive powers, also have certain shortcomings. For example, under certain conditions they have a tendency to cause thickening or to produce increases in the viscosity of water dispersible systems or of solvent, oil and oleoresinous coating systems during prolonged storage. Reaction with other pigments, crystal growth, and reaction with the fatty acids and/or other components of vehicles are believed to be contributing factors.

The pigments disclosed in said copending application comprise the hydration product of lead silicates falling within the ranges tetralead silicate ($4PbO \cdot SiO_2$)-lead orthosilicate ($2PbO \cdot SiO_2$) and tetralead silicate-litharge (PbO). These pigments are highly basic and are highly reactive.

In accordance with the present invention, it has been found that this effect upon viscosity gain can be substantially alleviated or eliminated and the pigment stabilized without sacrifice of corrosion inhibiting power.

And, in the practice of this invention, reaction of a portion of the PbO content of the pigment with an acid, or the salt of an acid which produces a practically insoluble salt of lead accomplishes this purpose. For example, chromic acid or a water-soluble chromium salt; sulfuric acid, or a water-soluble sulfate; phosphoric acid or a water-soluble phosphate can be used effectively. Similarly, carbon dioxide or a carbonate; and hydrochloric acid or a chloride are suitable. These reactants are cited by way of example only and in no way limit the scope of the invention.

The resulting pigments in each case have excellent corrosion inhibiting characteristics. They are finely divided, of a soft non-abrasive character, and may be readily dispersed or ground into paints using any of the known types of paint grinding equipment without harmful effect on the equipment.

Certain of the reacting chemicals which may be used in modifying the hydrated lead silicate have excellent corrosion inhibiting properties in their own right. For example, many of the cromium salts including lead chromate, either basic or normal; and many of the phosphates, including lead phosphate, either basic or normal, may be included in this category. When the lead compounds of the type indicated are formed in conjunction with the hydrated tribasic lead silicate described in said copending application, they supplement and add to the corrosion inhibiting power of that pigment. At the same time they stabilize the pigment to minimize changes in the viscosity of paints formulated with these pigments and subject to prolonged storage.

When chromic acid or a water soluble chromium salt is used, the resulting modified lead silicate-lead chromate pigment may be light yellow, medium yellow or orange in color, depending upon the degree of basicity of the lead silicate pigment and upon the quantity of chromic acid or chromium salt use in the reaction.

Where phosphoric acid or a water soluble phosphate; sulfuric acid or a water soluble sulfate; carbon dioxide (carbonic acid) or a water soluble carbonate, or any acid or salt which upon reaction yields a white, insoluble lead salt, is used, the resulting modified pigment is white. For many potential uses, white corrosion inhibitive pigments are a marked advantage since they permit the paint manufacture to tint his paint any color or shade be may desire.

In accordance with this invention, it has been found that the excellent polyvinyl chloride stabilization properties exhibited by the hydrated tribasic lead silicate pigments may be augmented and the product improved by modification of the original pigment by reaction with an acid or a salt of an acid which yields a lead salt, practically insoluble in water. In this case, it is preferred to use those reactants which yield lead salts white in color. These materials include, but are not limited to sulfuric acid and the sulfates; phosphoric acid and the phosphates; salicylic acid and the salicylates and others, including carbonic acid and the carbonates.

The literature contains references to the manufacture of composite pigments which, in some respects, may appear similar to those disclosed in this invention. For example, Nordyke in his Patent Number 2,354,475, discloses a method of producing lead arsenate which involves the use of anhydrous or hydrated lead silicates, covering a wide range of compositions, to provide a portion of the lead oxide necessary for the reaction. This disclosure is distinguishable from the present one in several significant ways. In the first place, in the patent cited, the lead silicate constitutes only a small fraction of the lead compounds entering into the reaction. It is added only for the purpose of providing a small quantity of gelatinous silica whose purpose is to coat the particles of lead arsenate and to promote adherence of the insecticide onto foliage. In the instant invention the lead silicate has completely reacted losing its original identity. Nordyke contains no reference to any value of the products disclosed as corrosion inhibitive pigments or as polyvinyl chloride stabilizing pigments. Such uses are not suggested, discussed, or contemplated, the sole emphasis being clearly directed to an improved insecticide.

Further, Patent Number 2,668,122, issued to Pitrot, discloses a composite pigment comprising lead chromate, lead silicate and silica in which basic lead chromate is formed by reaction between litharge and chromic acid in aqueous suspension with finely ground silica sand. The resulting lead chromate-silica mixture is filtered, dried and calcined. The pigment disclosed is said to be in "physico-chemical combination." It is further described as being a coating of basic lead chromate upon a silica core; the lead chromate particles being bonded to the unreacted silica core by an interfacial film of lead silicate formed during the calcining process.

According to an embodiment of the instant invention, the tribasic lead silicate pigment is modified with certain of the organic acids or salts which yield practically insoluble lead compounds, such as salicylic acid or sulfamic acid. These organic materials would be destroyed by the calcining stage which is an essential part of the Pitrot process and is critical in the formation and behaviour of his product.

There are other compositions of lead oxide and silica with other ingredients which are described in the literature or which are the subject of patents. These are invariably completely fused, partially fused, or are only partly in chemical combination.

In the instant process, all of the silica is combined with lead oxide and water prior to reaction with any modifying material. In the final step only a portion of the PbO represented by the basic portion of the molecule is reacted with the modifying acid or salt. In this manner all of the silica remains combined chemically with lead oxide and all of the lead oxide in each particle is chemically combined either with silica, or the modifying acid or salt.

The resulting product is uniform and homogeneous and is free from objectionable grittiness.

The hydrated lead silicates used in the practice of this invention are principally of two general types, as described herein and as discussed in considerably greater detail in copending application No. 38,137, filed June 23, 1960. The lead silicates used in the practice of this invention and falling within the range tetralead silicate ($4PbO.SiO_2$)-lead orthosilicate ($2PbO.SiO_2$) include, in theory, silica concentrations of from about 6.3 percent to about 11.8 percent, as calculated from formula weights. These are the theoretical limiting values of silica concentrations for the particular species, and it is obvious that in commercial practice the actual silica concentration must be intermediate between these values. As a matter of fact, the commercially produced product has, as expected, less than the theoretical maximum of 11.8 percent of silica, and ordinarily less than about 10 percent of silica. The other principal group of lead silicates which find utility in the practice of this invention are compounds falling within the formula ranges tetralead silicate ($4PbO.SiO_2$) and litharge (PbO). The theoretical limits of silica for these compositions cover the range zero (in the case of litharge, PbO) to about 6.3 percent silica (for the tetralead silicate, $4PbO.SiO_2$). Again, it is readily apparent that neither limit is reached in practice and the silica content of the compositions produced is intermediate the theoretical limits. For purposes of ready definition, the compounds useful in the practice of this invention are described as including those with silica content from zero to about 11.8%. In actual practice, it is obvious that neither limiting value is reached, and the silica concentrations are ordinarily within the range of 2 to 10 percent.

As a specific example of the process of the invention, 920 pounds of litharge and 80 pounds of silica as sand or as silica flour are blended and then fused and completely reacted either in a batch fusion or in a continuous melting furnace in accordance with general procedures well known in the art.

The molten lead silicate may then be quenched in water, or cooled in flake form by a method known as roll quenching which consists of flowing the molten mass onto water cooled rolls, and cooling the mass as it passes between the rolls. The lead silicate solidifies in ribbon form, then shatters into pieces resembling flakes.

Regardless of the quenching technique, the solidified material is pulverized in a suitable mill until the ground material will pass substantially completely through a 325 mesh screen.

1000 pounds of the ground tribasic lead silicate thus produced is added with constant stirring to 937½ pounds of water in a 500 gallon container which is provided with a stirring device and a source of heat. The heat source may be external or it may be a steam lance submerged in the slurry. Whatever the means of heating used, the temperature of the mixture is preferably maintained at about 150° F. during the period of hydration. It has been found that the addition of acetic acid and/or other acid which forms soluble lead salts or sodium hydroxide, potassium hydroxide or other alkali is helpful though not essential in bringing about complete reaction with the best speed. The reaction is rapid and requires no additional attritional action such as wet milling to permit completion.

A solution is prepared by dissolving 132 pounds of chromium oxide ($CrO_3$) in 110 pounds of water. This solution is slowly added, during a period of about one hour, to the slurry of hydrated tribasic lead silicate just described. The slurry is continuously and vigorously agitated during the entire period of addition of the solution of the $CrO_3$ dissolved in water.

As soon as the addition is complete the slurry may be filtered and the pigment obtained can be dried by any well known acceptable means. The dried pigment can then be pulverized to a fine power, or the concentrated slurry may be used directly as a pigment for water emulsion paints, or the slurry may be flushed in a suitable vehicle.

The final product is a finely divided orange colored pigment of high oil absorption.

An additional feature of the invention described herein is the discovery that extenders such as magnesium silicate, finely ground silica, diatamaceous silica and other commonly used extender pigments may be suspended in the slurry before, after or during the time the modifying acid is added to the hydrated tribasic lead silicate.

By this means the acid modified hydrated lead silicate pigment is intimately and homogeneously blended with the extender pigment or pigments. Filtering and dewatering characteristics are thus improved and excellent dispersion of the hydrated lead pigment and extender is attained.

Having thus described our invention and having described our procedure, we claim as new and desire to secure by Letters Patent:

1. As a new composition of matter, a pigment consisting essentially of a hydrated lead silicate within the ranges tetra lead silicate ($4PbO.SiO_2$)-lead orthosilicate ($2PbO.SiO_2$) and tetra lead silicate ($4PbO.SiO_2$)-litharge (PbO) in combination with the product of reaction of a portion of said hydrated lead silicate with an anion which forms an insoluble lead salt.

2. The method of making a pigment which comprises suspending in an aqueous medium a hydrated lead silicate within the ranges tetra lead silicate ($4PbO.SiO_2$)-lead orthosilicate ($2PbO.SiO_2$) and tetra lead silicate ($4PbO.SiO_2$)-litharge (PbO), slowly adding to said suspension a solution of an anion which forms an insoluble lead salt, and agitating said suspension and said solution during said addition and until said anion has reacted with a portion of said hydrated lead silicate to provide an insoluble lead salt of said anion.

3. The pigment of claim 11 in combination with extender pigments.

4. In the preparation of a hydrated tri-basic lead silicate, the improvement which comprises agitating an aqueous slurry of hydrated tri-basic lead silicate, adding to said aqueous slurry a solution containing an anion reactive with a portion of said hydrated tri-basic lead silicate to provide an insoluble lead salt of said hydrated lead silicate with said anion.

5. The process of making a pigment which comprises preparing an aqueous slurry of a hydrated tri-basic lead silicate, agitating said aqueous slurry, adding to said slurry an aqueous solution of an anion which forms an insoluble lead salt, while agitating said slurry containing the solution to promote reaction of said anion in said solution with a portion of said hydrated tri-basic lead silicate to provide a pigment consisting of a hydrated lead silicate and a product of reaction of said anion with said portion of said hydrated tri-basic lead silicate.

6. The process of claim 5 wherein said pigment subsequently is filtered from the slurry, is dried, and is pulverized.

7. The process of claim 5 wherein said slurry and said aqueous solution are heated to accelerate reaction between said hydrated tribasic lead silicate and said anion.

8. The method of claim 16 wherein the product formed is isolated by filtering, and is then subjected to the steps of drying, and pulverizing.

9. The method of claim 16 wherein the slurry product formed is added directly to water emulsion paints, obviating isolation, drying, and pulverizing of the pigment contained therein.

10. The method of preventing the thickening of film forming compositions containing lead silicate pigments which are the hydration product of compositions of the systems tetralead silicate ($4PbO \cdot SiO_2$)-lead orthosilicate ($2PbO \cdot SiO_2$) and tetralead silicate ($4PbO \cdot SiO_2$)-litharge (PbO), which method comprises dispersing said lead silicate hydrate in water to provide a slurry, agitating said slurry to maintain said lead silicate in suspension, adding to said agitated slurry an aqueous solution of an anion forming lead salts essentially insoluble in water, whereby a portion of the lead oxide (PbO) reacts with said anion to provide an insoluble lead salt of said anion.

11. As a new composition of matter, a pigment consisting essentially of a hydrated tri-basic lead silicate in combination with a product of reaction of a portion of said hydrated tri-basic lead silicate with an anion, the lead salt of which is essentially water-insoluble.

12. A pigment effective for stabilizing polyvinyl chloride compositions against deleterious effects of light and heat and consisting essentially of a hydrated tri-basic lead silicate in combination with a product of reaction of a portion of said hydrated tri-basic lead silicate with an anion, the lead salt of which is essentially water-insoluble.

13. A new pigment consisting essentially of a hydration product of lead silicate compositions falling within the system tetralead silicate ($4PbO \cdot SiO_2$) and lead orthosilicate ($2PbO \cdot SiO_2$) and a product of reaction of a portion of said hydration product of lead silicate with an anion selected from the group consisting of anions forming water-insoluble lead salts.

14. A new pigment consisting essentially of a hydration product of lead silicate compositions falling within the system tetralead silicate ($4PbO \cdot SiO_2$) and litharge (PbO) and a product of reaction of a portion of said hydration product of lead silicate with an anion selected from the group consisting of anions forming water-insoluble lead salts.

15. A new pigment consisting essentially of a hydration product of lead silicate compositions falling within the systems selected from the group consisting of tetralead silicate ($4PbO \cdot SiO_2$)-lead orthosilicate ($2PbO \cdot SiO_2$) and tetralead silicate ($4PbO \cdot SiO_2$)-litharge (PbO) and a product of reaction of a portion of said hydration product of said silicate compositions with an anion selected from the group consisting of chromate, dichromate, sulfate, phosphate, chloride, carbonate, salicylate, and sulfamate.

16. The method of making a corrosion-inhibitive pigment with comprises:

(A) preparing tri-basic lead silicate by:
   (1) mixing litharge and silica in the ratio of about 920 parts by weight of litharge and about 80 parts by weight of silica, to provide an intimate homogeneous blend,
   (2) heating said blend to a molten state to fuse components of said blend to provide a melt thereof,
   (3) cooling said melt to cool and solidify said tri-basic lead silicate to provide a dry lead silicate,
   (4) pulverizing the solidified lead silicate to produce a powdered lead silicate of a particle size passing through a 325 mesh screen;

(B) hydrating the tri-basic lead silicate by:
   (1) adding about 1,000 parts by weight of the tri-basic lead silicate produced hereinabove to about 940 parts by weight of water,
   (2) agitating to produce a slurry,
   (3) heating said slurry to a temperature of about 150° F. to effect hydration of said tri-basic lead silicate;

(C) reacting a portion of the hydrated tri-basic lead silicate with chromic oxide by:
   (1) preparing a solution comprising about 132 parts by weight of chromic oxide in about 110 parts by weight of water,
   (2) adding the solution of chromic oxide slowly, with continuous and vigorous agitation, to the slurry of (B) above during a period of about one hour to provide a finely divided orange colored pigment of high oil absorption.

17. The method of making a corrosion-inhibitive tri-basic lead silicate hydrate-lead chromate pigment of high oil absorption which comprises:

(A) preparing a slurry of hydrated tri-basic lead silicate,
(B) preparing a solution of chromic oxide in water,
(C) adding said solution of chromic oxide slowly, with continuous and vigorous agitation, to the slurry of (A) above during a period of about one hour to provide a finely divided orange colored pigment of high oil absorption.

18. The method of making a new pigment consisting of a hydrated tri-basic lead silicate in combination with a product of reaction of a portion of said hydrated tri-basic lead silicate with an anion, the lead salt of which is essentially water insoluble, said method comprising:

(A) preparing a slurry of said hydrated tri-basic lead silicate,
(B) preparing a solution of said anion in water,
(C) adding said solution to said slurry slowly with continuous agitation during a period of about one hour to provide a finely divided pigment.

References Cited in the file of this patent

UNITED STATES PATENTS

| | | |
|---|---|---|
| 2,236,051 | Barton | Mar. 25, 1941 |
| 2,354,475 | Nordyke | July 25, 1944 |
| 2,366,255 | Hallows et al. | Jan. 2, 1945 |
| 2,379,270 | Barton | June 26, 1945 |
| 2,668,122 | Pitrot | Feb. 2, 1954 |